(12) United States Patent
Granig et al.

(10) Patent No.: US 10,649,835 B2
(45) Date of Patent: May 12, 2020

(54) METHOD FOR DETERMINING INFORMATION ON AN INTEGRITY OF SIGNAL PROCESSING COMPONENTS WITHIN A SIGNAL PATH, SIGNAL PROCESSING CIRCUIT AND ELECTRIC CONTROL UNIT

(71) Applicant: Infineon Technologies AG, Neubiberg (DE)

(72) Inventors: Wolfgang Granig, Seeboden (AT); Dirk Hammerschmidt, Finkenstein (AT); Friedrich Rasbornig, Klagenfurt (AT); Michael Strasser, Villach (AT); Daniel Valtiner, Feld am See (AT)

(73) Assignee: Infineon Technologies AG, Neubiberg (DE)

( * ) Notice: Subject to any disclaimer, the term of this patent is extended or adjusted under 35 U.S.C. 154(b) by 145 days.

(21) Appl. No.: 15/883,169

(22) Filed: Jan. 30, 2018

(65) Prior Publication Data
US 2018/0239664 A1    Aug. 23, 2018

(30) Foreign Application Priority Data
Feb. 20, 2017   (DE) ................. 10 2017 103 418

(51) Int. Cl.
*G06F 11/07* (2006.01)
*G06F 11/10* (2006.01)
*H04L 29/08* (2006.01)

(52) U.S. Cl.
CPC ........ *G06F 11/079* (2013.01); *G06F 11/0745* (2013.01); *G06F 11/0757* (2013.01); *G06F 11/0793* (2013.01); *G06F 11/1004* (2013.01); *H04L 67/12* (2013.01)

(58) Field of Classification Search
CPC ............ G06F 11/0745; G06F 11/0757; G06F 11/0793; G06F 11/079; H04L 2012/40215; H04L 2012/40273
See application file for complete search history.

(56) References Cited

U.S. PATENT DOCUMENTS

| | | | | |
|---|---|---|---|---|
| 5,224,835 A | * | 7/1993 | Oltman | F04D 13/024 340/683 |
| 7,546,490 B2 | * | 6/2009 | Kearney | G06F 11/2273 714/32 |
| 9,213,323 B2 | * | 12/2015 | Wang | G05D 1/0066 |
| 9,725,073 B2 | * | 8/2017 | Haga | B60R 25/307 |
| 2005/0038623 A1 | | 2/2005 | Hammerschmidt | |
| 2016/0004585 A1 | | 1/2016 | Slama et al. | |
| 2016/0138492 A1 | | 5/2016 | Levy et al. | |

(Continued)

FOREIGN PATENT DOCUMENTS

JP    2009-161076    7/2009

OTHER PUBLICATIONS

Wikipedia, "ISO 26262," Oct. 9, 2017, 6 pages.

*Primary Examiner* — Nadeem Iqbal
(74) *Attorney, Agent, or Firm* — Harrity & Harrity, LLP (57) ABSTRACT

A method for determining information on an integrity of signal processing components within a signal path includes adding an alive signal to a signal at a first position within the signal path and detecting an added alive signal corresponding to the alive signal at a second position within the signal path. Further, the method includes determining the information on the integrity based on the detected signal.

20 Claims, 8 Drawing Sheets

(56) References Cited

U.S. PATENT DOCUMENTS

2016/0252599 A1* 9/2016 Motz .................. G01R 33/075
  324/251
2018/0309590 A1* 10/2018 Beckmann .............. H04L 12/12

* cited by examiner

METHOD FOR DETERMINING INFORMATION ON AN INTEGRITY OF SIGNAL PROCESSING COMPONENTS WITHIN A SIGNAL PATH, SIGNAL PROCESSING CIRCUIT AND ELECTRIC CONTROL UNIT

RELATED APPLICATION

This application claims priority under 35 U.S.C. § 119 to German Patent Application No. 102017103418.8, filed on Feb. 20, 2017, the contents of which are incorporated by reference herein in their entirety.

TECHNICAL FIELD

Examples relate to a method for determining information on an integrity of at least one signal processing component within a signal path, a signal processing circuit having a signal path for processing a sensor signal and an Electric Control Unit for receiving signals from a signal processing circuit.

BACKGROUND

Monitoring of signal processing components within signal paths is often desirable in order to conclude on an integrity of the signal processing components within the signal path or a specific part thereof. Monitoring of signal processing components within signal paths may allow to conclude, whether the signal processing components operate as desired and whether a signal output by the signal path can be relied on. One particular interest may be to be able to identify, whether a signal processing component still operates or whether it is eventually stuck, providing one and the same output independently from varying signals input into the signal processing component in question. This may, for example, be of interest if a system relies on sensor signals generated by sensors and subsequently processed within the signal path in order to trigger safety measures. For example, in automobiles, a wheel speed sensor device provides information on a rotational velocity of a wheel, which is received by an electronic control unit (ECU) in order to allow to conclude on safe driving conditions of the vehicle. In other examples, linear hall sensors provide an output signal proportional to the strength of a magnetic field at the sensor position or angular sensors provide an output indicating an angle of an observed object with respect to a reference. In typical sensor devices, the signal provided by the sensor is subsequently processed by some signal processing components of a signal path within the sensor device before the information on the observed quantity (e.g. a rotational speed or an angle) is transmitted to the ECU to be processed further. In the event of an error within the signal path within the sensor device or a part of the signal path constituted by the interface between the sensor device and the ECU, wrong information may be received and the safety of the passengers of the car may be at risk. Hence, there is a desire to determine information on the integrity of signal processing components within the signal path.

SUMMARY

An embodiment relates to a method for determining information on an integrity of at least one signal processing component within a signal path which comprises adding an alive signal to a signal at a first position within the signal path. The method further comprises detecting a signal corresponding to the alive signal at a second position within the signal path and determining the information on the integrity based on the detected signal. By observing the signal corresponding to the alive signal, one may be able to conclude whether the signal processing components between the first position and the second position operate reliably if further deliberate alterations of the alive signal between the two positions are known a priori or if no further alterations are expected. If the so determined expected alive signal is in fact detected, one may conclude that the signal processing components between the two positions operate without error and that integrity of those signal processing components can be assumed.

According to another embodiment, a signal processing circuit having a signal path for processing a sensor signal comprises an alive signal generator configured to add an alive signal to the sensor signal at a first position within the signal path. Using an embodiment of a signal processing circuit may allow other signal processing components within the signal processing circuit or further processing elements receiving data of from the signal processing circuit to check, whether some or all of the signal processing components within the signal processing circuit operate reliably.

According to a further embodiment, an Electric Control Unit for receiving signals from a signal processing circuit comprises an integrity determination circuit configured to receive an added alive signal and to determine an integrity of at least one signal processing component within the signal processing circuit based on a comparison of the added alive signal and an expected alive signal. Using an embodiment of an Electric Control Unit may allow concluding on the reliability of operation of one or more signal processing components within the signal processing circuit as well as on the reliability of an interface between the Electric Control Unit and the signal processing circuit.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
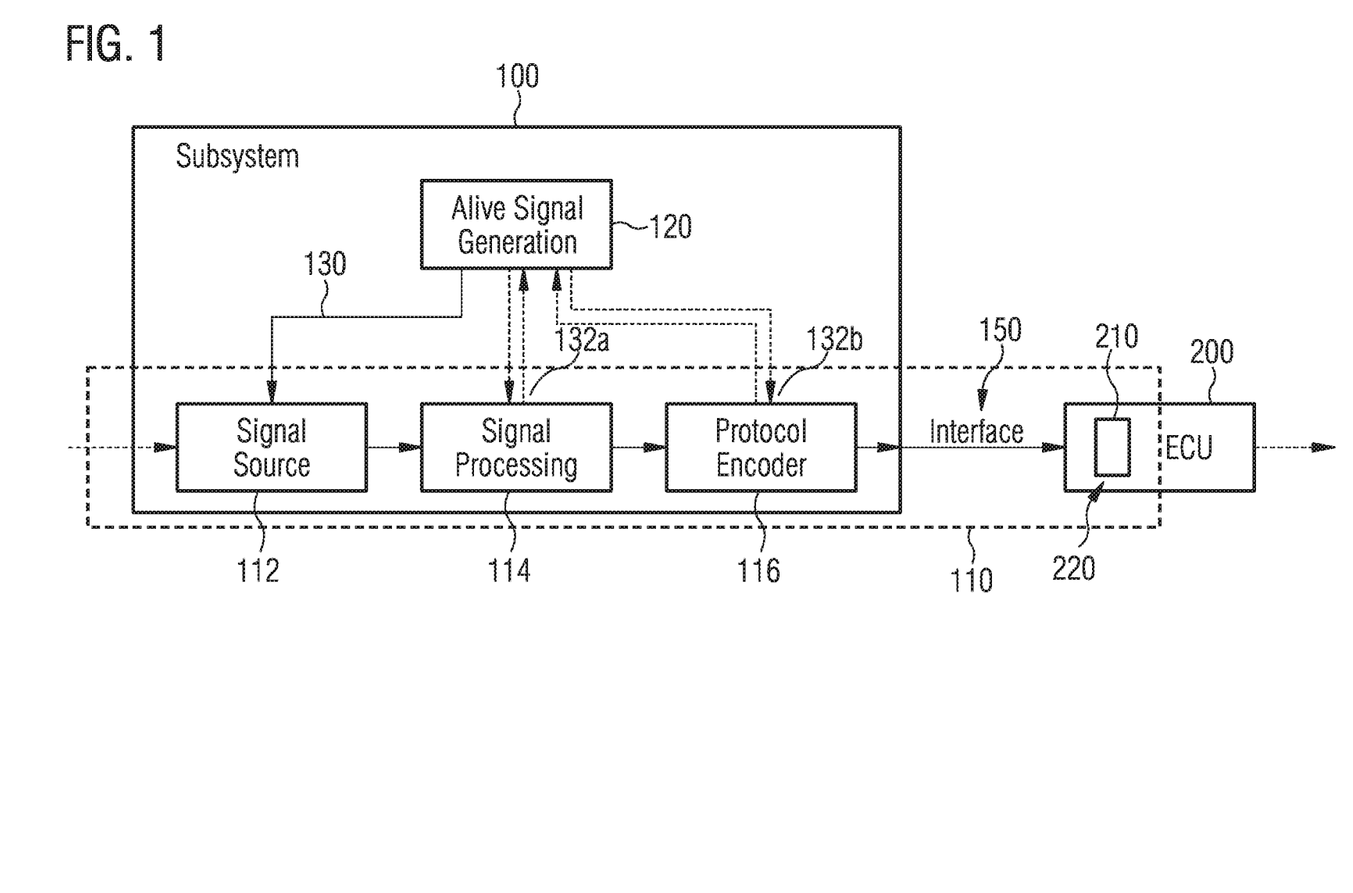
FIG. 1 illustrates an example of a signal processing circuit having a signal path allowing to add an alive signal to a signal within the signal path.

FIG. 1 illustrates a signal processing circuit 100 having a signal path 110 for processing sensor signals. The signal processing circuit 100 further comprises an alive signal generator 120 configured to add an alive signal to a signal at a first position 130 within the signal path 110. The signal processing components within the signal path 110 comprise a signal source 112 to initially generate a signal and a signal processing element 114 to further process the signal. Further, the signal path 110 comprises a protocol encoder 116 used to format data generated by the signal processing element 114 to comply with a data protocol chosen for a signal interface 150. The signal processing circuit 100 transmits data to the Electric Control Unit 200 via signal interface 150.

Further, FIG. 1 schematically illustrates an Electric Control Unit (ECU) 200 for receiving signals from the signal processing circuit 100. The ECU 200 comprises an integrity determination circuit 210 configured to receive the added alive signal and to determine an integrity of at least one signal processing component within the signal path 110 based on a comparison of the added alive signal received and an expected alive signal. Depending on the first position 130 with respect to a second position 220 of the integrity determination circuit 210, examples may be capable of determining information on an integrity of one or more signal processing components within the signal path 110.

Figure 3:
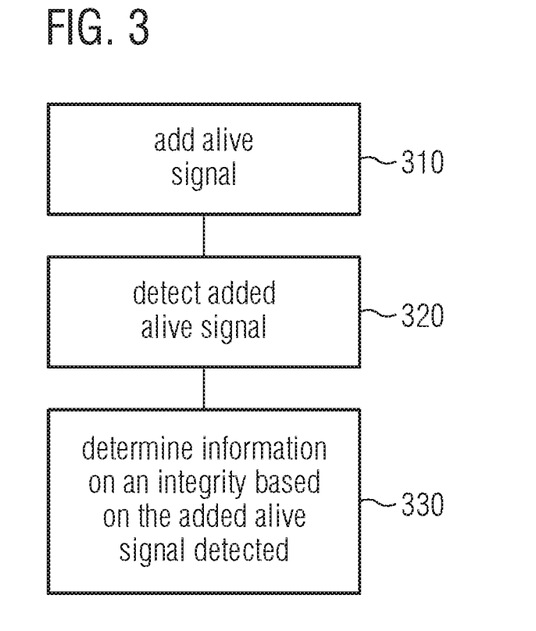
FIG. 3 illustrates a flow chart of a method for determining information on an integrity of signal processing components within a signal path.

While the ECU 200 and the signal processing circuit 100 may be two different hardware entities connected via the signal interface 150, the following explanation of some aspects of the embodiments described herein will jointly describe the functionality of the signal processing circuit 100 and the ECU 200 to appropriately describe the interaction between, for example, the alive signal generator 120 and the integrity determination circuit 210, being also illustrated by means of a flow chart in FIG. 3.

As illustrated in the flowchart of FIG. 3, some embodiments add an alive signal to a signal at a first position 130 within the signal path 110 and detect a signal that corresponds to the alive signal at the second position 220 within the signal path 110. In the exemplary embodiment illustrated in FIG. 1, the first position 130 is within the signal processing circuit 100 while the second position 220 is within the ECU 200. That is, the signal path 110 to be monitored extends over two entities, the signal processing circuit 100 and the ECU 200. As elaborated on in the following paragraphs, the information on the integrity of signal processing components within the signal path 110 is determined based on an added alive signal which is received by the integrity determination circuit 210. In case of error free operation, the added alive signal corresponds to the alive signal, e.g. it depends on the alive signal according to a predetermined relationship or it may be equal to the alive signal, depending on the circumstances. An example for the information on the integrity of signal processing components which is derived is that all signal processing components operate without error. However, the information on the integrity of signal processing components derived according to further embodiments may also include more details, such as for example an information, how many of the signal processing components within the signal path operate without error and how many do not.

Further embodiments may provide information about the operational status (e.g. erroneous or not erroneous) of each signal processing component within the signal path. Generally, the information on the integrity of signal processing components within the signal path may be any kind of information allowing to conclude, whether signals or data are processed without error along the signal path 110 or within parts thereof. Further embodiments may provide statistical information as the information on the integrity of signal processing components, as for example a probability estimate for all signal processing components working without error.

In the embodiment illustrated in FIG. 1, the signal processed within the signal path 110 is generated within the signal path 110 itself by means of the signal source 112. The signal source itself can be any means to generate a signal, be it digital or analog and the signal may be generated in an arbitrary digital or analog representation. For example, the signal source 112 may be a sensor for sensing a physical quantity that outputs an analog or a digital signal which is related to the sensed physical quantity. In the exemplary signal path 110, a signal processing element 114 receives the signal generated by the signal source 112 and processes it further before the processed signal is transferred to the protocol encoder 116 to transfer it to the ECU 200 via the interface 150. An example of a signal processing element 114 may be an analog-to-digital converter to convert an analog signal provided by a sensor acting as signal source 112. According to the embodiment illustrated in FIG. 1, the alive signal generator 120 adds (embeds) an alive signal to the signal generated by means of the signal source 112 and at a first position 130 at the very beginning of the signal path 110. Some alternatives as to how an alive signal may be added to a signal within a signal path 110 are subsequently discussed within respect to FIGS. 4 to 9.

Adding an alive signal to the signal within the signal path 110 results in the alive signal being represented within the signal processed within the signal path 110 by some means, while the technical details of the adding or insertion (embedding) of the alive signal depend on the particular implementation.

The integrity determination circuit 210 receives the added alive signal. When the added alive signal corresponds to or is equal to an expected alive signal, the integrity determination circuit 210 may conclude that the signal processing components within the signal path 110 operate without an error so that integrity of the signal path can be assumed. The expected alive signal is a signal that can be determined from a priori knowledge of the functionality of the individual signal processing components within the signal path 110 between the first position 130 and the second position 220. The expected alive signal can be computed from the alive signal assuming an error-free operation of all signal processing components within the signal path 110. In other words, the integrity determination circuit 210 is configured to determine the expected alive signal using the alive signal and an expected signal processing algorithm to compute the expected alive signal. According to one embodiment, for example, the alive signal may simply be forwarded by every signal processing component within the signal path 110 so that the receipt of the added alive signal itself (being the expected alive signal) at the second position 220 by means of the integrity determination circuit 210 allows to conclude that all signal processing components within the signal path 110 operate without error.

An embodiment as disclosed in FIG. 1 may, for example, allow to also detect malfunctions where one signal processing element within the signal path 110 is stuck. Being stuck, a signal processing component may still output a valid output signal. However, internal updating mechanisms may be out of order so that the signal output by the signal processing component in error remains constant rather than being updated. When being stuck, the alive signal would not be forwarded or output by the signal processing component being stuck and, hence, also such type of error can be detected by the embodiments described herein.

Figure 2:
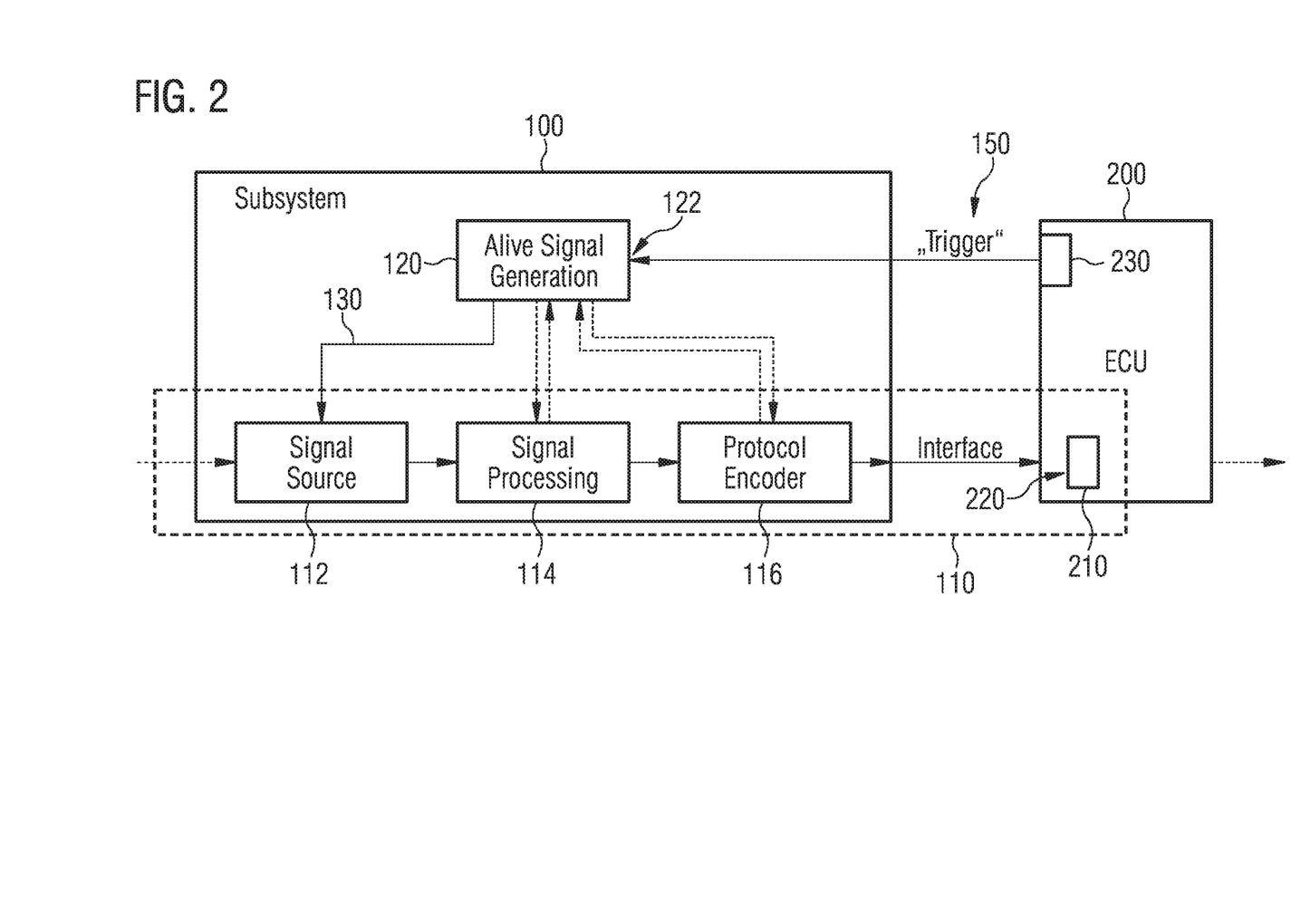
FIG. 2 illustrates a further example of a signal processing circuit having a signal path allowing to add an alive signal upon a request of a ECU.

Depending on the particular implementation, the alive signal may be a signal that is added only once to a signal within the signal path or the alive signal may comprise a series of individual subsignals subsequently added, the series being known to the integrity determination circuit. If, for example, the interface 150 between the signal processing circuit 100 and the ECU 200 is a unidirectional interface, the alive signal may be a signal sequence of known subsignals in order to be able to determine, whether an individual signal processing component within the signal path is stuck. If, however, the interface between the ECU 200 and the signal processing circuit 100 is bidirectional, as illustrated in FIG. 2, an alive signal may only be transmitted a single time upon reception of a trigger signal (trigger pulse) sent from the ECU 200 to the alive signal generator 120.

Some embodiments of signal processing circuits 100 comprise an alive signal generator 120 that comprises a signal input 122 configured to receive such a trigger signal. The alive signal generator 120 is then configured to add the alive signal in response to the receipt of the trigger signal. Once the integrity determination circuit 210 knows when to expect the receipt of the alive signal, a single transmission of an alive signal may be sufficient to conclude on an integrity of the signal path 110 due to the correlation of the sending of the trigger signal and the receipt of the added alive signal.

The trigger signal may be an arbitrary signal causing the signal processing circuit to submit an alive signal which may be known in advance. According to further embodiments, however, the bidirectional interface may also be used to transmit the alive signal from the ECU 200 to the signal processing circuit 100 so as to be able to generate the alive signal to be used within the signal processing circuit 100 at the ECU 200. To this end, the ECU 200 may comprise an output interface 230 which is configured to output a control signal for the signal processing circuit 100. The control signal comprises the alive signal or the trigger signal that causes the alive signal generator 120 to add the alive signal into the signal path 110.

In some embodiments, the output interface 230 of the ECU 200 is configured to output a control signal for the signal processing circuit 100, the control signal comprising a reflected alive signal that depends on the added alive signal received by the integrity determination circuit 210. Returning the reflected alive signal from the ECU 200 to the signal processing circuit 100 may enable to also determine information on the integrity of the ECU 200. Assuming, as an example, that the added alive signal as received by the integrity determination circuit 210 is returned (reflected) as the reflected alive signal, the alive signal generator 120 is capable to conclude that not only the signal path 110 but also the ECU are working without error if the reflected alive signal is equal to the alive signal added before. Like conclusions can be drawn if the added alive signal is altered by the ECU before being returned as the reflected alive signal, once the deliberate alterations to the added alive signal are known by the signal processing circuit 100.

FIGS. 1 and 2 illustrate that the alive signal is added to the signal path 110 at the first position 130 at the very beginning of the signal path 110, resulting in a high diagnostic coverage of the signal path 110. The diagnostic coverage is a quantity indicating how many of the signal processing components within the signal path are covered, i.e. the number of components that can be assumed to operate without an error when the expected alive signal is received by the integrity determination circuit 210. Higher diagnostic coverage may result in the associated device to be classified as having a higher level of reliability or integrity according to a specific standard or, for example according to the IEC EN 61508 Standard (Functional safety of electrical/electronic/programmable electronic safety related systems), which defines four Safety Integrity Levels (SILs), with SIL 4 being the most dependable and SIL 1 being the least. Automotive applications with high diagnostic coverage may, for example, also achieve a higher SIL value according to the Automotive Safety Integrity Level (ASIL), being standardized in ISO 26262. ISO 26262 defines four Safety Integrity Levels, with ASIL D being the most dependable and ASIL A being the least.

As further indicated by dashed lines in FIGS. 1 and 2, the alive signal generator 120 may also insert the alive signal at other positions 132a or 132b within the signal path 110. According to further embodiments, additional alive signals may be added to the signal path at each of the positions 132a and 132b allowing to determine, which of the signal processing elements within the signal path is operating erroneously or stuck. For example, the receipt of an expected alive signal for only the additional alive signals added at position 132b may allow to conclude, that protocol encoder 116 works without an error while signal processing element 114 exhibits an error.

According to a further embodiment, the alive signal as added at the first position 130 may be altered at third position 132a (and eventually also at fourth position 132b) within the signal path 110, the third position 132a being between the first position 130 and the second position 220. If the expected alteration of the alive signal at the third position 132a is known, the expected alive signal can be computed considering the originally-inserted alive signal and the desired alteration. If the so expected alive signal is received, it can be concluded that the complete signal path 110 is operating without error. If, however, only the originally-inserted alive signal was received, it can be concluded that the signal path is operating, however, with the signal processing element 114 at the third position 132a being stuck so that the alteration of the originally-inserted alive signal does not take place.

If the original alive signal is altered according to a predetermined algorithm at every signal processing component within the signal path 110, the integrity determination circuit 210 within the ECU 200 is capable of deriving which of the signal processing components within the signal path 110 is stuck or inoperable.

In summary, FIGS. 1 and 2 illustrate different ways for the alive signal generator 120 to generate an alive signal and where to add it to a signal within the signal path. In the embodiment illustrated in FIG. 1, the alive signal is generated within the signal processing circuit 100, which may, for example, be a sensor subsystem. In the embodiment illustrated in FIG. 2, the ECU 200 influences the generation of the alive signal in an application having a bidirectional interface. One possible way of influencing the generation of the alive signal is to trigger the generation of an alive signal within the signal processing circuit 100. Depending on the interface 150, further to triggering a predetermined alive signal, the ECU 200 may be capable of transmitting the alive signal to be added to the signal path 110.

For example, for sensor subsystems, unidirectional communication between a sensor system and an associated ECU may be established using the Single Edge Nibble Transmission protocol (SENT, SAE J2716). For bidirectional communication, a Short PWM Code interface (SPC) or a Peripheral Sensor Interface 5 (PSI5) may be used. In both scenarios, the alive signal may be added to the signal at arbitrary positions within the signal path 110, which is at or in between arbitrary signal processing components within the signal path. For example, if a sensor system is monitored, the alive signal may be added directly at the sensor or as an additional input to an analog-to-digital converter used to digitize the output of the sensor. Further to detect and check the signal corresponding to the alive signal at the integrity determination circuit 210 within the ECU 200 only, the alive signal and/or its associated processing may also be checked and controlled by or within each signal processing component within the signal path, for example within the signal processing element 114 and the protocol encoder 116 of the exemplary signal path 110 illustrated in FIGS. 1 and 2.

According to some embodiments, the alive signal is added at the signal source and further alive signals are added at different signal processing components within the signal path 110 to allow identifying the signal processing component having an error within the signal path 110. For the same purpose, the alive signal may be added or injected to the signal source and the alive signal may be checked or modified in a predetermined manner at each of the signal processing components within the signal path 110 in the signal processing circuit 100. The alive signal is processed within the protocol encoder 116 to transmit the alive signal or a signal based on the alive signal to the ECU 200. In implementations where the alive signal is continuously monitored along the individual signal processing components of the signal path 110, the signal processing circuit 100, e.g. its alive signal generator 120, may be capable of detecting certain errors or malfunctions of individual signal processing components itself and transmit an associated message to the ECU 200, informing the ECU 200 about the occurrence of an error and eventually also on the signal processing component causing the error or being stuck.

While FIGS. 1 to 3 have previously been used to describe embodiments allowing to determine an information of an integrity of signal processing components within a signal path 110, FIGS. 4 to 8 illustrate some particular implementations as to how the insertion or adding of the alive signal to a signal within the signal path 110 may be achieved.

Before going into details regarding possible insertion or adding of the alive signal into the signal path 110, some examples for appropriate alive signals are briefly summarized, keeping in mind that the alive signal can generally be any signal or signal sequence, be it analog or digital. One possible use of an alive signal may be the adding or insertion of a toggle bit into the data path. A toggle bit may be characterized as a quantity that alternatingly has two states. In terms of digital implementations, a first state may be a logical one while a second state may be a logical zero. Alternate implementations of toggle bits may likewise represent the toggle bit as two alternating analog quantities. The alive signal itself may, for example, be implemented as a toggle bit allowing to monitor the change of the toggle bit at predetermined time intervals so as to be able to conclude that every signal processing component along the signal path is working properly. According to further examples, the toggle bit may, for example, control more complex alive signal generators so as to for example add a further element of an alive signal sequence into the signal path on each occurrence of the state change of the toggle bit.

A further example for a possible alive signal is a counting signal as, for example, generated by means of a rolling counter. Similar to the toggle bit, the value output by the rolling counter may itself represent the alive signal while further embodiments may use the output of the rolling counter to control the generation of a more complex alive signal. The counter's direction may further be controlled to count up or down in some embodiments.

A further example for an alive signal is a pseudorandom sequence which may itself serve as an alive signal having multiple elements which are subsequently added to the signal path, i.e. to subsequent data frames generated within a signal path 110. Further, the pseudorandom sequence may control the alive signal generation in that the alive signal is deferred from the values of the pseudorandom sequence.

Further, a predefined signal sequence may be used as an alive signal or to control the alive signal generation. Such a predefined sequence may, for example, be stored in a read-only memory within the signal processing circuit 100 and/or the ECU 200. In an alternative implementation, the predefined sequence may be defined by the hardware used and being based on particular hardware characteristics. According to some embodiments, the predefined sequence may be programmable by a user of a signal processing circuit or the associated electric control circuit 200, for example, by programing an EEPROM.

Figure 4:
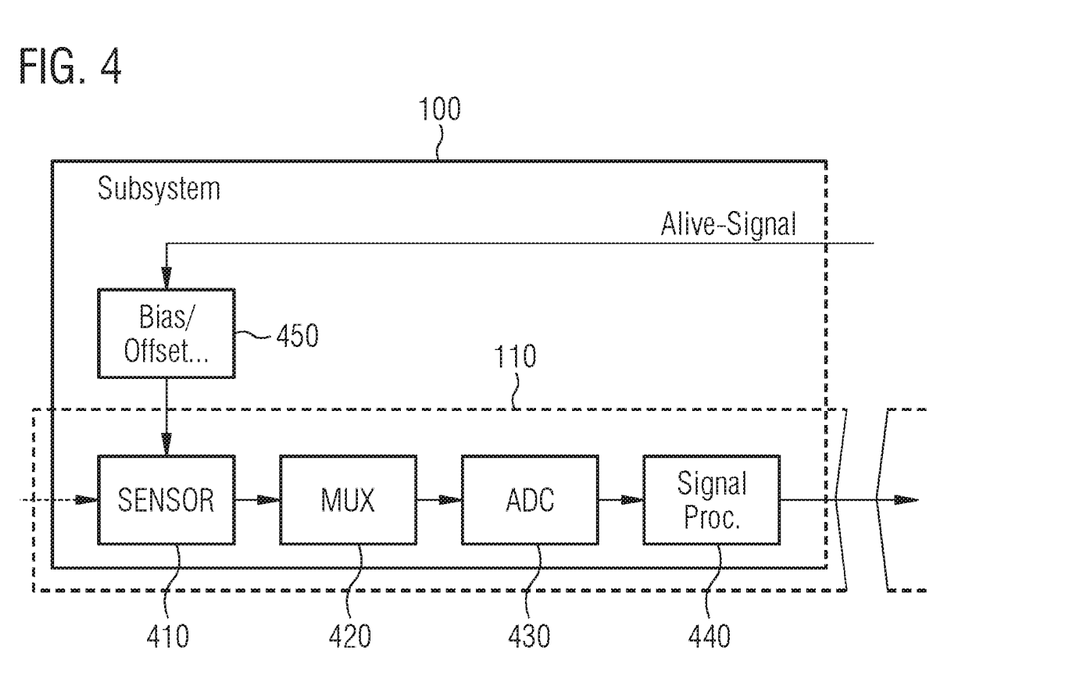
FIG. 4 illustrates a block diagram illustrating a first example for adding an alive signal.

FIG. 4 illustrates one particular example as to how an alive signal may be added into the signal path 110 by changing an operating condition of a sensor 410 according to the alive signal. While embodiments of signal processing circuits may principally be composed of arbitrary signal processing components, the following examples of FIGS. 4 to 8 describe signal processing circuits comprising at least one sensor acting as a signal source. In such signal processing circuits, one possible way to add the alive signal is to change an operating condition of the sensor 410 according to the alive signal. The exemplary signal path 110 illustrated in FIG. 4 comprises a sensor 410 whose output is connected to one of multiple inputs of a multiplexer 420, the output of the multiplexer being connected to an analog-to-digital converter 430 to digitize their sensor's output value and the digitized quantity is forwarded to a signal processing element 440 for further processing, such as for example for averaging subsequent sample values of the sensor's output (e.g. for noise suppression). For the simplicity of the illustration, further possible components of the signal path 110 are not illustrated in FIG. 4 while it is to be understood that the signal path 110 might comprise multiple more signal processing elements up to the integrity determination circuit used to evaluate the added alive signal and to determine information of the integrity of the signal path, e.g. whether all its signal processing components operate without an error.

In the particular implementation of FIG. 4, the operating condition of the sensor 410 is changed or modified in that a bias or offset value is added to the sensor output by means of a biasing circuit 450. This may result in an analog output provided by the sensor 410 in being modified or modulated with the alive signal. This may, for example, be achieved by modifying an operating point or supply voltage of the sensor 410 or by directly adding an analog signal, e.g. a current or a voltage, to the sensor's output. If an alive signal sequence is known, averaging multiple subsequent sensor readings within the integrity determination circuit may achieve both, reconstructing the physical quantity determined by the sensor as well as determining the added alive signal sequence. If the added alive signal sequence which is received corresponds to the alive signal sequence added to the signal path by means of the offset circuit 450, integrity of the signal path can be assumed. In other words, an additional offset may be added into the data path which is detected by an analysis block at the end of the data path, while more measurement periods are evaluated and an average of subsequent sensor readings is computed to average out individual offset values due to the alive signal.

Figure 5:
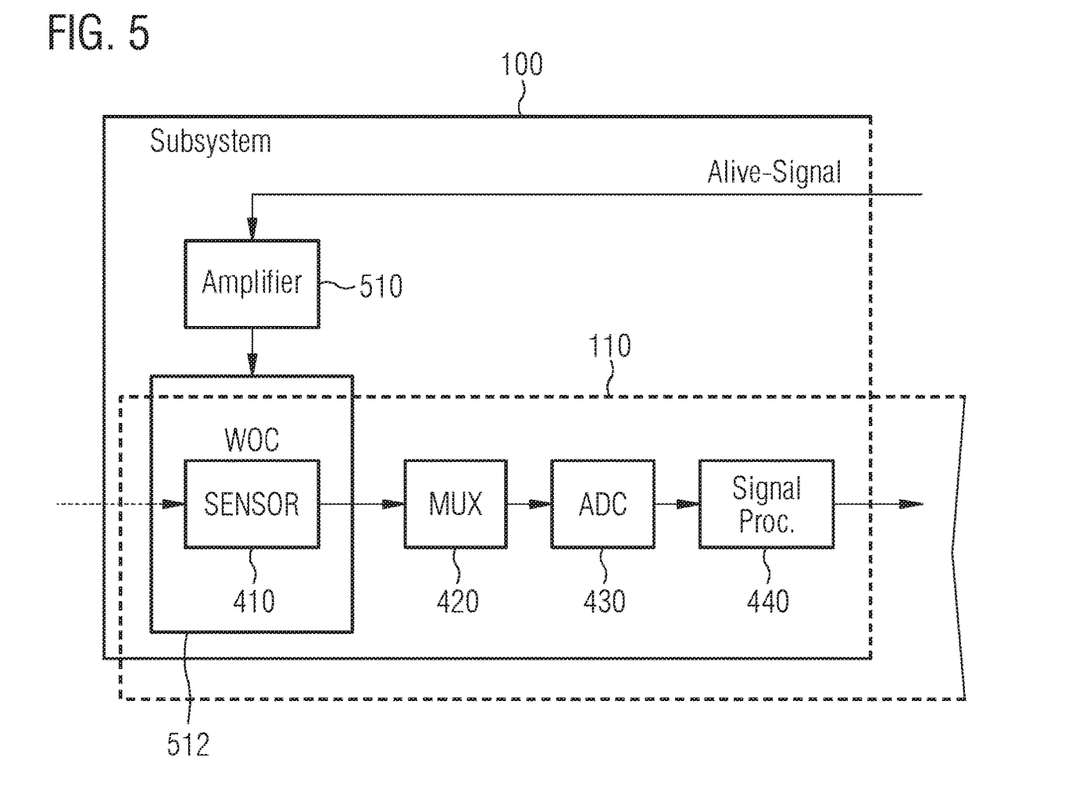
FIG. 5 illustrates a block diagram illustrating a second example for adding an alive signal.

Based on a similar setup, FIG. 5 illustrates a further possibility of adding the alive signal into the signal path 110. According to the example illustrated in FIG. 5, a physical quantity sensed by the sensor 410 is altered according to the alive signal. In the particular example illustrated in FIG. 5, the sensor 410 is a magnetic field sensor and an amplifier 510 is used to drive a wire-on-chip 512. The wire-on-chip 512 generates a magnetic field controlled by the amplifier 510, which is in turn controlled by the alive signal so as to generate sensor readings having superimposed or added the alive signal or the alive signal sequence. While FIG. 5 illustrates a magnetic sensor as an example as to how to achieve the superposition of the alive signal to a physical quantity sensed by a sensor, other sensor types may use different mechanisms. For example, temperature sensors may be influenced by heating cells close to the sensor which are controlled by the alive signal. Likewise, an electrical voltage may influence capacitive sensors, as for example pressure sensors or the like.

Figure 6:
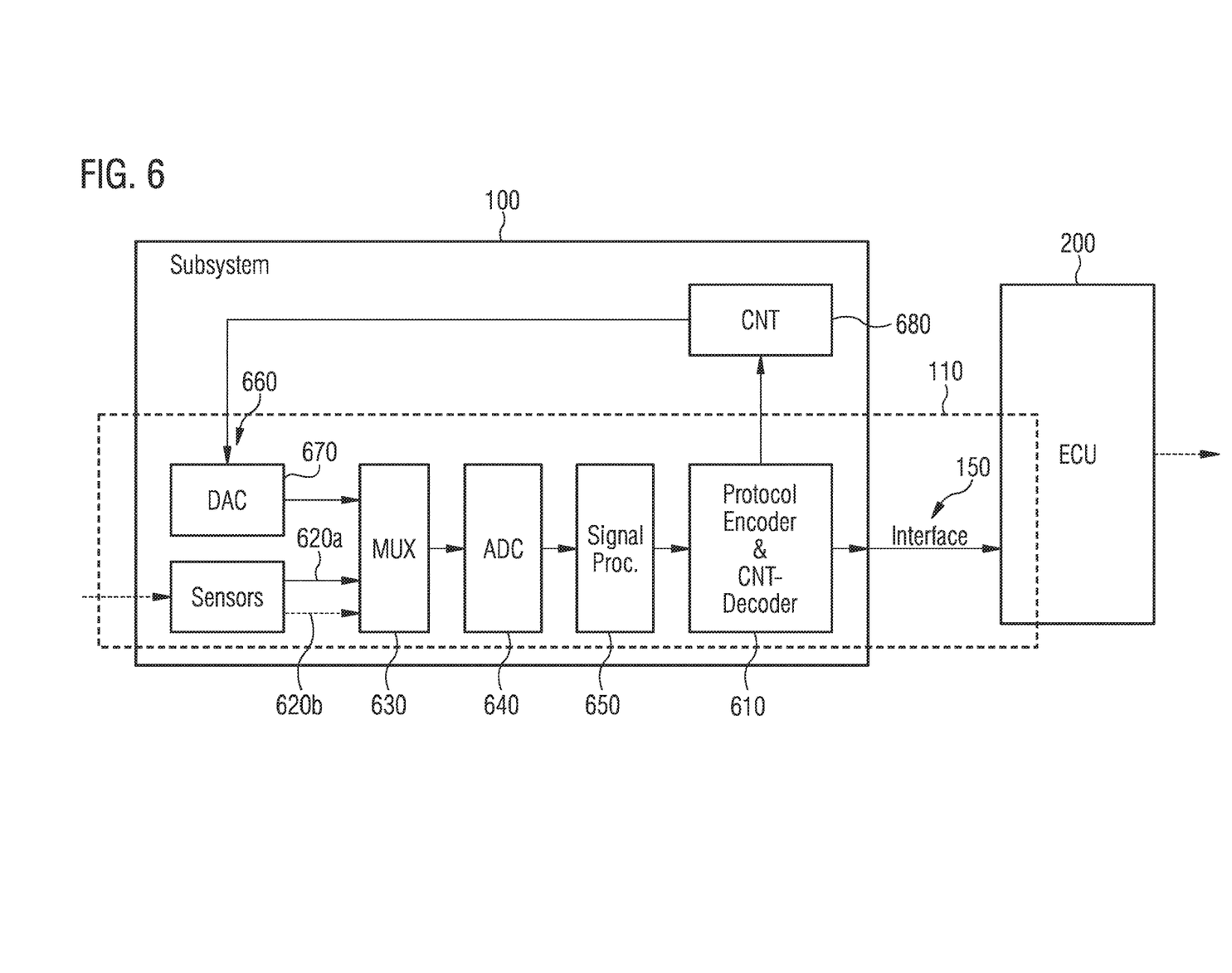
FIG. 6 illustrates a block diagram illustrating a third example for adding an alive signal.
Figure 7:
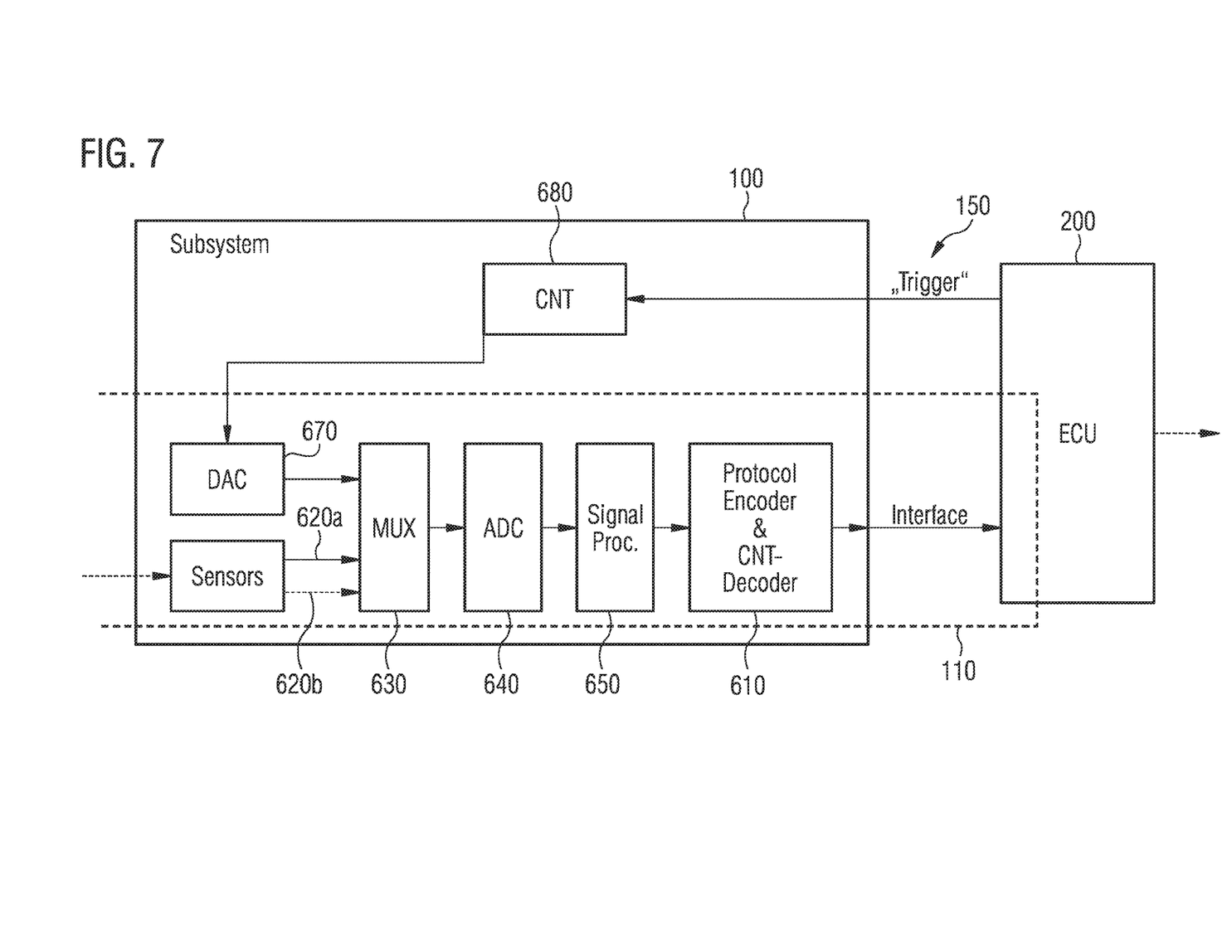
FIG. 7 illustrates a block diagram illustrating an example for adding an alive signal in response to a trigger of a ECU.
Figure 8:
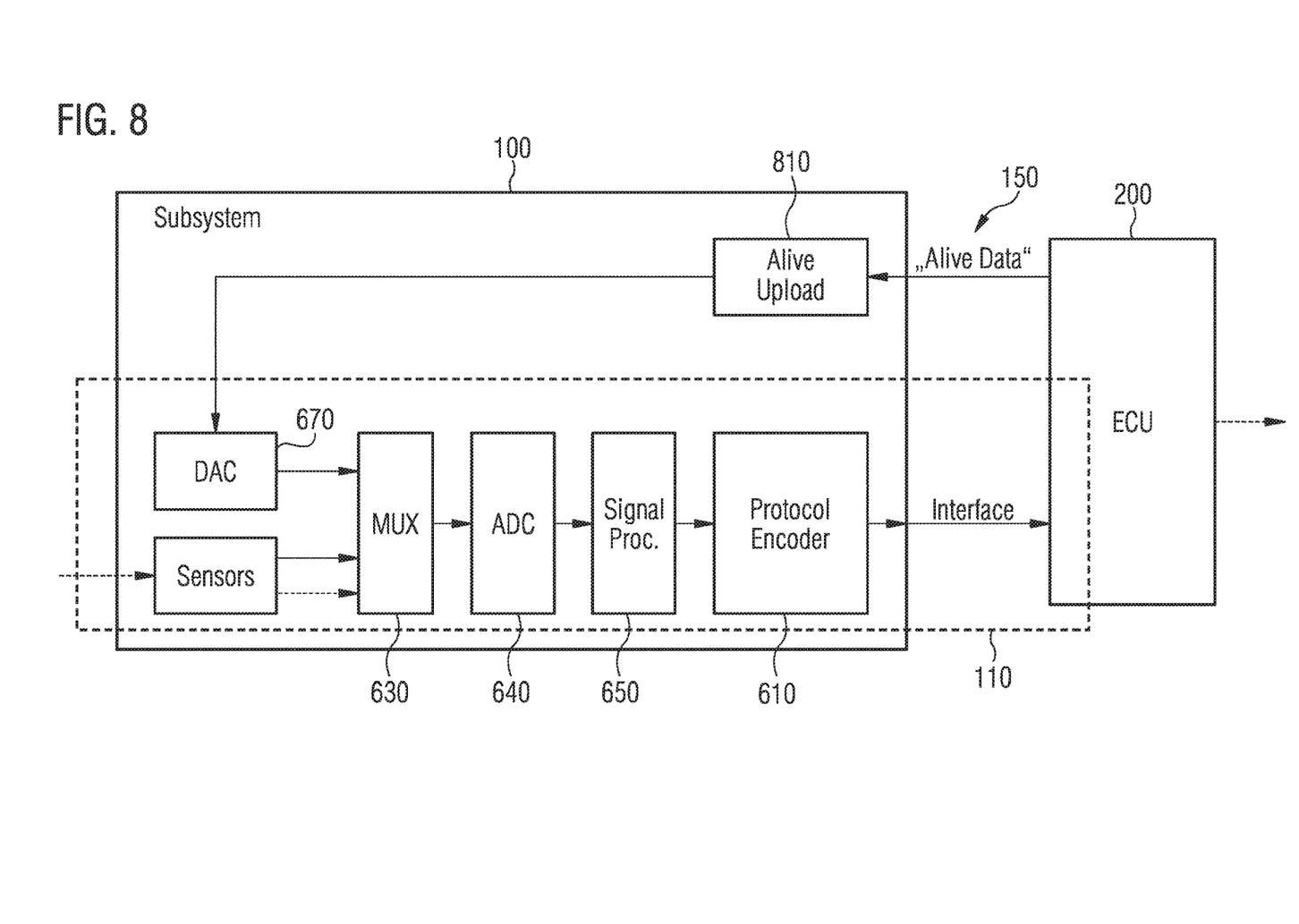
FIG. 8 illustrates a block diagram illustrating an example for adding an alive signal provided by a ECU.

FIGS. 6 to 8 illustrate further embodiments in which several sensor readings are submitted to ECU 200 within a common message frame generated by a protocol encoder 610 within the signal path 110. To this end, multiple sensors 620a, 620b, . . . may be connected to a multiplexer 630 providing its output to an analog-to-digital converter 640 (ADC), which is similar to the architecture of FIGS. 4 and 5. Following the ADC 640, a signal processing element 650 may perform further signal processing on the digitized sensor readings while the protocol encoder 610 includes the sensor readings of all sensors into a single data frame which is subsequently submitted to the ECU 200 via interface 150. For example, using an SPC interface, sensor data of up to four sensors may be transmitted from a signal processing or sensor circuit 100 to an associated ECU 200. In the example illustrated in FIG. 6, the alive signal is added to the signal within the signal path 110 at a first position 660 before the multiplexer 630 using a digital-to-analog converter 670. The digital-to-analog converter 670 provides an analog output signal according to the alive signal to the multiplexer 630 so as to include the alive signal in the message frame generated by the protocol encoder 610 within data fields that may also be used for the transfer of sensor data. In the particular implementation of FIG. 6, a counting signal generated by a counter 680 is used as an alive signal while further embodiments may likewise add arbitrary other alive signals into the signal path 110 using the same implementation.

FIG. 7 illustrates a similar implementation using a bidirectional communication interface 150 between the signal processing circuit 100 and the ECU 200 to insert the alive signal at a predetermined position within a message frame generated by the signal processing circuit 100, in particular by its protocol encoder 610. Similar to the embodiment of FIG. 6, the alive signal is given by the output of a counter 680. Other than in FIG. 6, the bidirectional interface 150 is used to send a trigger signal from the ECU 200 to the signal processing circuit 100 causing the alive signal generator, which is counter 680 in this particular implementation, to add the alive signal in response to receipt of the trigger signal from the ECU 200. Similar to the implementation illustrated in FIG. 6, the alive signal, i.e. a digital value representing the output of the counter 680 is added into a data field of a message frame generated by the protocol encoder 610. The data field can also be used for sensor data in other implementations relying on the same architecture. In other words, the data field used for the transmission of the alive signal is reserved for sensor data according to the protocol specification.

FIG. 8 illustrates a further embodiment based on a similar architecture. However, the bi-directional interface 150 between the ECU 200 and the signal processing circuit 100 is used to directly communicate the alive signal to be inserted or added to the signal within the signal path 110. To this end, the alive signal generator may be constituted by a receiver 810 to receive the alive signal and to forward the alive signal 820 upon its receipt to the digital-to-analog converter 670. The embodiment illustrated in FIG. 8 may allow a user of the system to directly determine the alive signal to be used for the generation of the information on the integrity of the signal path 110.

Figure 9:
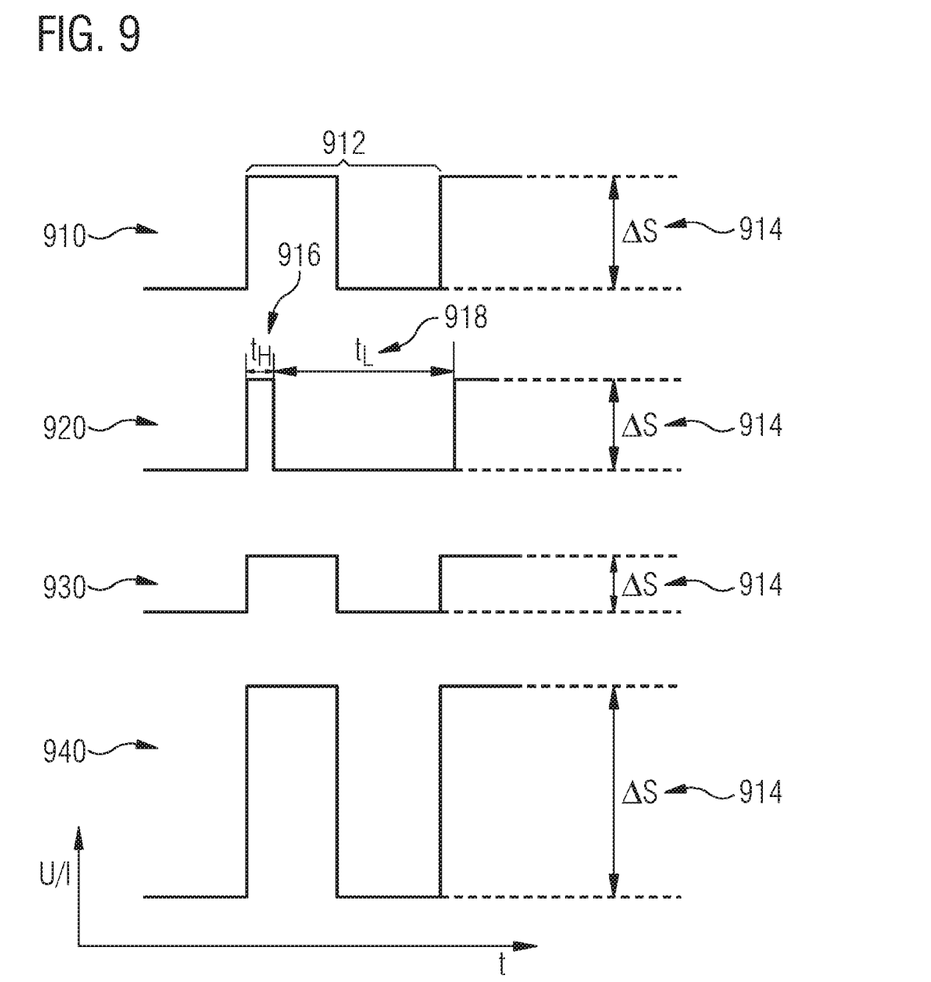
FIG. 9 illustrates examples for adding an alive signal to a PWM Signal used to transmit a Sensor readout.

FIG. 9 illustrates a further example for adding an alive signal to the sensor signal when a pulse width modulated (PWM) signal is used to transmit the sensor signal. The upper graph 910 illustrates a signal cycle 912 of the PWM protocol used to transfer a sensor signal. The PWM protocol is a signaling protocol that may be defined or characterized by at least one parameter. A first parameter to characterize the PWM protocol may be the cycle time between two rising edges, i.e. the time used for a full signal cycle 912. Alternatively or additionally, a second parameter to characterize or define the signaling protocol may be the difference ΔS (914) between a voltage or a current corresponding to the high state of the PWM signal and the low state of the PWM signal. Conventional PWM implementations may transmit information by varying the duty cycle of the PWM signal, i.e. the ratio between the times the PWM signal is high (tH, 916) and low (tL, 918) within a single cycle time.

In a particular simple implementation, a PWM signal as illustrated in the upper graph 910 of FIG. 9 may be used to transmit the repeated occurrence of a particular event by starting a full signal cycle 912 on every occurrence of the event while maintaining the duty cycle constant, e.g. at the 50% illustrated in the upper graph 910 FIG. 9. An example for the use of such a simple and cost efficient implementation is wheel speed sensors of vehicles, which are used, amongst others, as an input to antilock braking systems. For every fraction of a full rotation of a wheel, a full PWM cycle as illustrated in the upper graph 910 may be transmitted by the wheel speed sensor. Graphs 920, 930 and 940 illustrate, how an alive signal may be added without a significant increase in complexity even to such a comparatively simple signaling protocol.

The alive signal is added by altering a parameter of the PWM protocol according to the alive signal. FIG. 9 illustrates 3 particular examples for a PWM signal. Graph 920 illustrates that a variation of the duty cycle of the PWM signal can be used to add the alive signal. Assuming that the occurrence of a full signal cycle 912 indicates the occurrence of a particular event (e.g. the rotation by a given angle), deviating from the preconfigured duty cycle as indicated in the second illustration 920 may be used to add the alive signal or to transmit a single bit of an alive signal given by a predefined signal sequence. For example, the alive signal may be defined as a signal sequence in that every nth cycle is transmitted with an altered duty cycle. Further alive signal sequences may also use unequal spacings for the altered duty cycles.

In further examples, the voltage or current difference ΔS may be varied to add the alive signal or a signal sequence constituting the alive signal, as illustrated in graphs 920 and 930. While in graph 930, a decrease of ΔS is used to add or transmit a bit of the alive signal, graph 940 illustrates that, likewise, an increase of ΔS can be used for the same purpose.

While the previous examples have been illustrated for a PWM signal, further examples may likewise alter at least one parameter of other signaling protocols to add the alive signal in a similar manner which may result in a significant increase of the functional safety of the associated components. This comes without significant additional effort and without significantly increased hardware costs, enabling enhanced functional safety ratings also for low complexity and low cost sensors, such as for example for wheel speed sensors.

In summarizing the embodiments of FIGS. 6 to 8, the alive signal is processed as a known defined sensor signal to be added into a sequence of sensor values inside a frame communicated from the signal processing circuit 100 to the ECU 200. This may be achieved by any digital-to-analog converter (which can even be a simple voltage divider) which provides the alive signal to be finally transferred as digital data in the same data frame besides real sensor signals (for example further to temperature, voltage or other sensor values). After receiving the transmitted data frame, the converted digital value transmitted within a data field of the data frame can be chosen to extract the added alive signal (bit combination or sequence) at the integrity determination circuit within the ECU 200.

In particular, FIG. 7 illustrates a receiver-triggered counter 680, which count value is used as the alive signal. The count value selects a certain analog value for the digital-to-analog converter 670 which is transferred within one data frame and can be decoded by the protocol encoder or directly within the integrity determination circuit within the ECU 200. FIG. 8 illustrates an embodiment using a receiver-transferred alive signal which value is used as the alive signal. The alive signal selects a certain analog value for the digital-to-analog converter 670 which is again transferred within one data frame and can be decoded by the protocol encoder 610 or by the ECU 200. FIG. 6, instead, illustrates a self-generated or triggered alive signal generator using a counter 680.

FIG. 4 illustrates an embodiment where the alive signal influences the sensor signal via an offset or a bias value. In FIG. 5, the alive signal influences the sensor signal by a physical perturbation or by altering the physical quantity sensed by the sensor. Using a digital sensor protocol, as for example one of the protocols SENT, SPC or PSI5, the alive signal may be transmitted or added to a separate data field. An alive signal may be a rolling counter nibble. Also, the alive signal may be transmitted in a status field of the protocol or, alternatively, be coded into a cyclic redundancy check value of a data frame. To this end, the alive signal generator may be configured to generate a seed value for the generation of a cyclic redundancy check (CRC) value of a message frame. The CRC value is then computed based on a seed value given by the alive signal. At the integrity determination circuit, the CRC value is computed using the same seed value, i.e. depending on the alive signal. In the event of a valid CRC value, the integrity determination circuit could then conclude that all signal processing components within the signal processing path operate without error.

Similarly, for a receiver triggered or generated signal or alive signal, the alive signal generator and its operation may be triggered by a trigger signal submitted over an interface 150 between the ECU 200 and the signal processing circuit 100. An alive signal may, for example, be a counter signal, a pseudorandom sequence or a predefined sequence. In some embodiments, the alive signal may be directly transferred via the bidirectional interface. Particular examples of Protocols for transferring the alive signal or for triggering the generation of an alive signal at the end of the signal processing circuit are the SPC interface or the PSI5 interface. In the event of the SPC interface, the trigger pulse may, for example, trigger the alive signal generator. As an alternative, for example, the alive signal itself may be transferred in the addressed bits and, hence, within an SPC trigger message. According to the SPC protocol, the dedicated length of the trigger pulse may so be used to trigger the alive signal generator or to directly set the counter values of the alive signal generator. In the event of the PSI5 interface, the trigger pulse may trigger the action of the alive signal generator or, similar to the SPC interface, the trigger pulse may directly set the alive signal (coded in length).

At the end of the signal path within a receiver or the ECU 200, the alive signal may be decoded so that the complete signal path 110 up into the ECU 200 would be covered (high diagnostic coverage). Alternatively, the alive signal may be decoded at the end of the signal path within the signal processing circuit 100, for example within the protocol encoder 610 to separately transmit an information on an integrity of the signal path to the receiver or the ECU 200, for example by means of a status bit. As previously discussed, the alive signal may also be coded into the CRC value (e.g. by means of a seed value depending on the alive signal). The processing and evaluation of the alive signal within the integrity determination circuit of the ECU may have a data processing delay and may not necessarily need to be performed synchronously with the evaluation of the sensor values.

While the previous embodiments have been mainly described for a sensor system as an example for a signal processing circuit, further embodiments may be implemented in arbitrary applications using signal paths to subsequently process data or signals by numerous signal processing devices.

By using the alive signal performing a logic or arithmetic change of signals within the signal path (data path), which is received by the ECU separately or convoluted in existing data, functional safety can be established. When the alive signal is continuously changing (or toggling) the signal can be used to determine the alive status of the subsystem (e.g. the sensor system or the signal processing circuit). Other than existing solutions, the alive signal may be fed directly to the start point of the signal path or the signal processing chain of the sensor subsystem and is continuously processed within the whole data path or signal path to be demultiplexed at the end of the signal path, where the information on the alive signal is further transmitted within the protocol. To this end, an external receiver is able to evaluate the existence (or the sequence) of the alive signal or of an expected alive signal generated using the alive signal and can use the transmitted or added alive signal to judge whether the sensor is processing data accordingly or if some of the signal processing components within the signal path are working erroneously or whether the data path is stuck. To this end, it can be determined if a subsystem is still alive or not. This is important for functional safety applications like, for example, electronic power steering applications. For example, angular sensors providing information on the position of the steering wheel in a power steering application are required to fulfil the highest safety requirements as defined by ASIL D. While this may be highly relevant for a sensor system in automotive applications, it is also relevant for all other safety relevant systems providing or requiring that the sensor shall enable to the ECU to detect a malfunction, for example a signal path being stuck. As compared to alternative approaches where a signal change is detected to determine information on the integrity of the signal path, examples described above provide the additional benefit that the determination of the information of the integrity of the signal path is also possible if there is no noise altering the signals on the signal line. Further, the embodiments described herein do not disturb the data signal itself and the information on the integrity of the signal path is furthermore meaningful even if the signal generated by the signal path is constant. As compared to a signal comparison between two redundant sensors measuring the same physical quantity, embodiments described herein even allow to provide a meaningful information on the integrity of the signal path if the measured signal of both answers is constant or changing more slowly than the safety time (the time where one requires to be sure that the signal path is working properly). As opposed to methods only directed to the signal interface by including a toggling bit or a changing signal inside a protocol encoder, embodiments described herein do additionally verify the correctness and the correct update of the further components within the signal path, in particular of potentially every signal processing element along the signal path.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining information on an integrity of at least one signal processing component within a signal path, comprising:
   receiving a trigger signal;
   adding, based on receiving the trigger signal, an alive signal to a first signal at a first position within the signal path;
   detecting a second signal at a second position within the signal path,
      the second signal being based on adding the alive signal to the first signal; and
   determining the information on the integrity based on the second signal.

2. The method of claim 1, wherein adding the alive signal comprises:
   adding the alive signal by changing an operating condition of a sensor according to the alive signal.

3. The method of claim 1, further comprising:
   altering the alive signal using a signal processing element at a third position within the signal path,
      the third position being between the first position and the second position.

4. The method of claim 1, wherein the first position is located within a sensor configured to sense a physical quantity; and
   wherein the second position is located within an electric control unit configured to receive sensor data of the sensor.

5. The method of claim 1, further comprising:
   providing a reflected alive signal, that depends on the second signal, from the second position to the first position.

6. A signal processing circuit having a signal path for processing a sensor signal, the signal processing circuit comprising:
   an alive signal generator comprising a signal input configured to receive a trigger signal,
      the alive signal generator being configured to add an alive signal to the sensor signal at a first position within the signal path based on receiving the trigger signal.

7. The signal processing circuit of claim 6, wherein the alive signal generator is further configured to:
   change an operating condition of a sensor according to the alive signal.

8. The signal processing circuit of claim 7, wherein the alive signal generator is further configured to:
   alter a physical quantity sensed by the sensor.

9. The signal processing circuit of claim 7, wherein the sensor signal is generated by the sensor; and
   wherein the alive signal generator is further configured to:
      add an offset to the sensor signal.

10. The signal processing circuit of claim 6, wherein the alive signal generator is further configured to:
    alter a parameter of a signaling protocol used to transmit the sensor signal according to the alive signal.

11. The signal processing circuit of claim 6, wherein the alive signal generator is further configured to:
    insert the alive signal at a predetermined position within a message frame generated by the signal processing circuit.

12. The signal processing circuit of claim 11, wherein the alive signal generator is further configured to:
    insert the alive signal into a data field, of the message frame, reserved for sensor data.

13. The signal processing circuit of claim 6, wherein the alive signal generator is further configured to:
    generate a seed value for generation of a cyclic redundancy check value of a message frame based on the alive signal.

14. The signal processing circuit of claim 6, wherein the alive signal generator is further configured to:
    use the trigger signal to directly set the alive signal.

15. The signal processing circuit of claim 6, further comprising:
    a signal source configured to provide the sensor signal;
    at least one signal processing component configured to process the sensor signal; and
    a protocol encoder configured to generate a message frame based on the sensor signal,
       wherein the signal source, the at least one signal processing component, the protocol encoder, and the alive signal generator are monolithically integrated.

16. An Electric Control Unit for receiving signals from a signal processing circuit, the Electric Control Unit comprising:
    an integrity determination circuit configured to:
       receive an added alive signal,
          the added alive signal being based on an alive signal being added to a signal in response to a trigger signal, and
       determine information regarding an integrity of at least one signal processing component within the signal processing circuit based on a comparison of the added alive signal and an expected alive signal.

17. The Electric Control Unit of claim 16, further comprising:
- an output interface configured to output a control signal for the signal processing circuit,
  - the control signal comprising the alive signal or the trigger signal.

18. The Electric Control Unit of claim 16, further comprising:
- an output interface configured to output a control signal for the signal processing circuit,
  - the control signal comprising a reflected alive signal depending on the added alive signal.

19. The Electric Control Unit of claim 16, where the integrity determination circuit is further configured to:
- process the alive signal; and
- determine the expected alive signal based on processing the alive signal.

20. The method of claim 1, further comprising:
- generating a seed value for generation of a cyclic redundancy check value of a message frame,
  - the alive signal being coded into the cyclic redundancy check value.

* * * * *